United States Patent Office 3,560,099
Patented Feb. 2, 1971

3,560,099
COLORIMETER FLOW CELL INCLUDING A BAFFLE TO REMOVE GAS BUBBLES
Christian Thorkild Boe, Farum, and Mogens Myrup Andreasen, Copenhagen, Denmark, assignors to Instituttet for Produktudvikling, Danmarks Tekniske Hojskole, Lyngby, Denmark, a corporation of Denmark
Filed July 7, 1969, Ser. No. 839,528
Claims priority, application Denmark, July 10, 1968, 3,385/68
Int. Cl. G01n 1/10
U.S. Cl. 356—246       6 Claims

ABSTRACT OF THE DISCLOSURE

A colorimeter flow cell with opposed windows for the passage of a light beam. The cell is divided in two chambers by a wall extending parallel to the light beam. Liquid enters the first chamber and flows to the second chamber through upper and lower apertures in the wall. Gas is separated from the liquid in the first chamber and passes to an outlet from the second chamber without interfering with the light beam, as the windows are at a lower level than the upper apertures.

---

Figure 1:
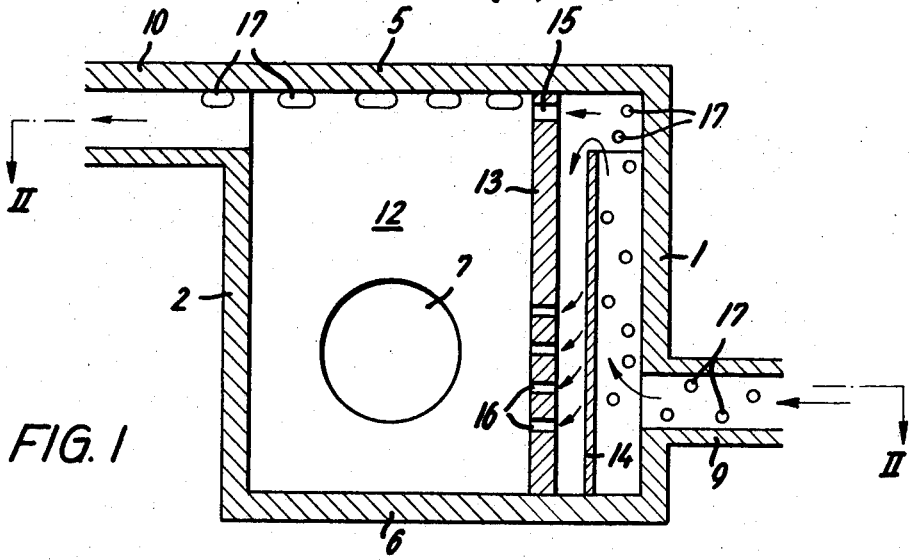

This invention relates to a flow cell for colorimetric examination of liquids, such as aqueous solutions, which cell comprises a liquid inlet opening and a liquid outlet opening, said openings being located in two opposed side walls of the cell, and two windows located opposite each other in end walls of the cell.

The liquid to be examined or controlled, flows through the cell, and a light beam passes through the liquid flowing between the two windows. The light beam is then compared with a reference light beam which does not pass through the liquid so that any changes in the composition of the liquid influencing the absorbtion of light in the cell, may be detected. Apparatus of this kind is utilized inter alia in haemodialysis apparatus for controlling leakage from the blood circuit to the dialysis liquid circuit.

The flow cell according to the present invention is characterized in that it is divided into a first chamber and a second chamber by means of a vertical partition wall extending between the inlet opening and the windows substantially perpendicular to the windows, said partition wall having flow apertures in the upper and lower parts thereof, of which the upper apertures are located above the level of the windows, and further in that a baffle plate sealingly joined to the bottom and side wall of the cell is provided in the first chamber in front of the inlet opening with its upper edge located above the level of the lower apertures in the partition wall.

With a cell according to the invention, the liquid flowing into the cell is forced to first move upwards through the first chamber and hence through the apertures in the partition wall before the liquid flows past the windows. The forced deflection or bending of the flow ensures an effective separation of any contents of gasses in the liquid since such gasses will tend to rise towards the upper part of the first chamber and from there they will flow through the upper apertures in the partition wall, together with a part of the liquid, and furtheron to the outlet of the cell without disturbing the light transmission through the windows. The liquid flowing through the lower apertures into the second or main chamber will be substantially liberated of gas bubbles which otherwise might weaken or attenuate the light beam and consequently distort the result of the measurement at the subsequent comparison with the reference light beam. As a consequence of the reduced measuring error it is possible to employ a larger amplification of the signal from the cell and consequently obtain a more exact measurement and safer control of the condition of the liquid.

The horizontal cross-sectional area between the baffle plate and the associated side wall may be small compared to the cross-sectional area of the remainder of the first chamber between the side wall and the vertical partition wall. This feature ensures a relatively high speed of the liquid flowing into the first chamber and thereby supports the desired separation of gas from the liquid.

The lower apertures in the partitional wall may be directed towards the windows in which case the liquid degassed in the first chamber may be utilized to flush any gas bubbles on the windows away therefrom.

A very effective flushing of the windows may be obtained by providing a plurality of apertures above each other in the vertical zone in which the windows are located. When the inflow area is devided in this way there is provided a plurality of strong liquid jets which sweep across the window area.

Figure 2:
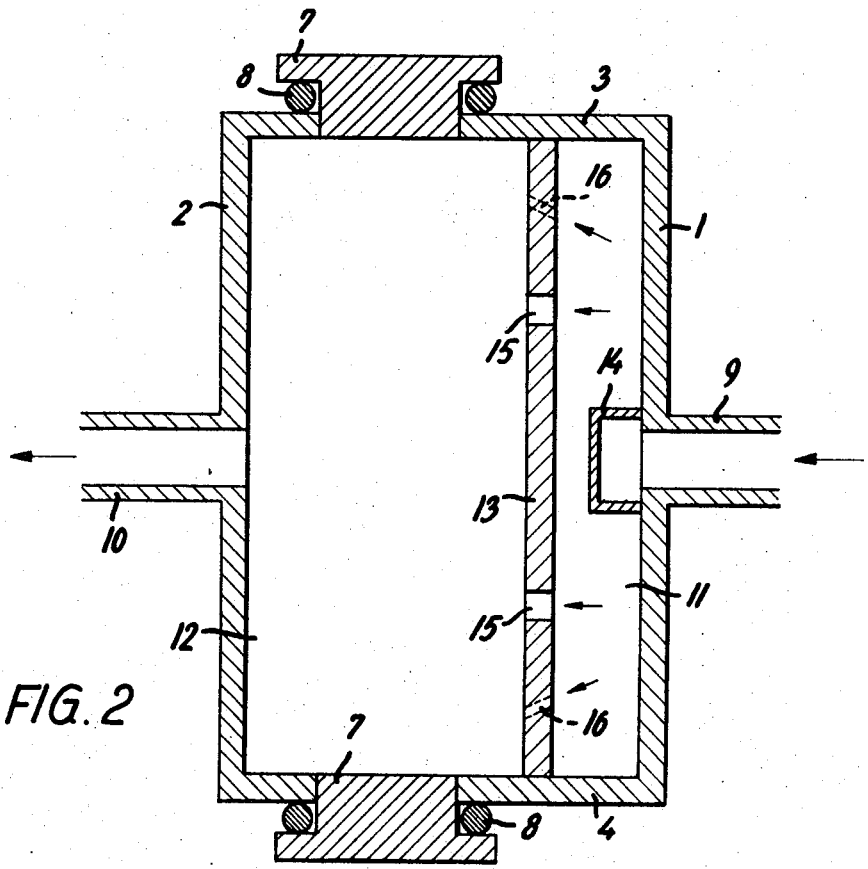

In view of the flushing of the windows it is expedient to locate the lower apertures closer to the end of the partition wall than the upper apertures. The invention will now be described in more detail with reference to the accompanying drawing in which FIG. 1 is a vertical cross-section through a flow cell embodying the present invention, and FIG. 2 is a horizontal section taken on line II—II of FIG. 1.

The colorimeter flow cell shown in the drawing comprises two vertical side walls 1 and 2, two end walls 3 and 4, a top wall 5 and a bottom wall 6. The cell or container walls are made of opaque material, e.g. sheet metal, and in the two opposed end walls 3 and 4, two transparent or translucent windows 7 are secured by means not shown in detail. Each window is sealed around the associated opening in the cell end walls by means of an O-ring 8 of resilient material. In the lower part of the side wall 1 there is provided an inlet opening or branch 9 for the liquid to be examined. An outlet opening or branch 10 is provided in the upper part of the opposed side wall 2.

The cell is divided internally into a first chamber 11 and a second or main chamber 12 by means of a vertical partition wall 13. The wall 13 is placed relatively close to the inlet 9 and it is liquid-tight connected to the wall 3, 4, 5 and 6 of the cell. In the first chamber 11 there is furthermore mounted a vertical baffle plate 14 which in horizontal section, see FIG. 2, is U-shaped, and which is liquid-tight connected to the bottom wall 6 and the side wall 1 on opposite sides of the inlet 9. As shown in FIG. 1 the upper edge of the baffle plate 14 is located at a distance below the top wall 5. In the upper portion of the partition wall 13 a plurality of flow apertures 15 are provided closely below the top wall 5 and at a higher level than the upper edge of the baffle plate 14. In the lower part of the wall 13 there are provided other flow apertures 16. In the embodiment shown there are four apertures 16 arranged in a vertical line at each end of the wall 13, and the apertures are inclined towards the inner face of the window 7 located at that end of the cell or container. The two flow apertures 15 shown in the upper part of the partition walls are located nearer to the longitudinal center of the cell.

The cell shown may be utilized for controlling liquids from the blood circuit in a hemodialysis apparatus to the dialysis liquid circuit in which latter the cell will then be included. The liquid flowing through the cell is examined or checked by means of a light beam passing through the two windows 7 of the cell. The light beam will be attenuated to a greater or smaller extent depending upon the permeability of the liquid in respect of the light employed. After having passed the liquid in the cell the light beam is compared to a reference light beam which may origin from the same light source as the beam passing through the cell. The comparison yields a signal representative of the absorption of light in the liquid. Measuring errors may occur if the liquid contains gas bubbles which reflect and thereby attenuate the light or if such gas bubbles are present on the inner faces of the windows 7.

It will appear from FIG. 1 how any gas or air bubbles 17 in the inflowing liquid will substantially be separated from the liquid in the first chamber 11 due to the forced deflection of the liquid flow above the upper edge of the baffle plate 14 and further to and through the apertures 15 and 16 in the partition wall 13. The bubbles will flow into the second or main chamber 12 through the upper apertures 15 and continue below the top wall 5 of the cell into the outlet 10. The liquid flowing through the apertures 16 is substantially free of air due to the double deflection in the first chamber so that the passage of the light beam through the lower parts of the chamber 12 between the windows 7 will not—or only to a negligible degree—be disturbed by such air or gas bubbles. The inclination of the apertures 16 further ensures that the liquid flowing into chamber 12 is directed towards the inner side of the windows whereby any bubbles of air or other gas which might be present on the windows, are liberated under the influence of the liquid jets.

The gas separation in the first chamber 11 is further promoted by the fact that the volume defined between the inlet 9 and the baffle plate 14 comprises only a minor part of the total volume of the first chamber which will be apparent from FIG. 2, and the liquid speed therefore decreases abruptly in the moment where the liquid flows over the upper edge of the baffle plate so that the liquid does not tend to entrain the bubbles 17.

What we claim is:

1. A flow cell for the colorimetric examination of liquids, comprising first and second opposed side walls, two opposed end walls, a top wall and a bottom wall, a liquid inlet located in said first side wall and a liquid outlet located in said second side wall, a window in each of said end walls, said windows being located opposite each other for permitting transmission therethrough of a light beam, a vertical partition wall sealed liquid-tight between said end walls and said top and bottom walls and located between said first side wall and said windows, extending substantially perpendicularly to the windows, whereby the cell is divided into a first chamber and a second chamber; upper and lower apertures located in the upper and lower portions, respectively, of said partition wall, said upper apertures being located above the level of said windows; a baffle means sealingly joined to said bottom wall and said first side wall in front of said inlet opening, the upper edge of said baffle means being located above the level of said lower apertures in the partition wall.

2. A flow cell as claimed in claim 1, wherein the horizontal cross-sectional area defined between said baffle means and said first side wall is small compared to the cross-sectional area of the remainder of said first chamber between said side wall and said vertical partition wall.

3. A flow cell as claimed in claim 1, wherein said inlet opening is located at the bottom of said first chamber and said outlet opening is located at the top of said second chamber.

4. A flow cell as claimed in claim 1, wherein said lower apertures in the partition wall are directed towards said windows.

5. A flow cell as claimed in claim 4, wherein said lower apertures include a plurality of apertures located above each other at each end of said partition wall in the vertical zone, in which the associated window is located.

6. A flow cell as claimed in claim 4, wherein said lower apertures are located closer to the ends of said partition wall than said upper apertures.

References Cited
UNITED STATES PATENTS 3,345,910   10/1967   Rosin et al. _____ 356—246

RONALD L. WIBERT, Primary Examiner

O. B. CHEW II, Assistant Examiner